(12) United States Patent
Fei et al.

(10) Patent No.: US 9,537,636 B2
(45) Date of Patent: Jan. 3, 2017

(54) METHOD AND DEVICE FOR ALLOCATING RESOURCES TO CARRIER RESPONSE INFORMATION

(71) Applicant: ZTE CORPORATION, Shenzhen, Guangdong (CN)

(72) Inventors: Peiyan Fei, Shenzhen (CN); Focai Peng, Shenzhen (CN)

(73) Assignee: ZTE CORPORATION (CN)

( * ) Notice: Subject to any disclaimer, the term of this patent is extended or adjusted under 35 U.S.C. 154(b) by 158 days.

(21) Appl. No.: 14/362,054

(22) PCT Filed: Nov. 15, 2012

(86) PCT No.: PCT/CN2012/084640
§ 371 (c)(1),
(2) Date: May 30, 2014

(87) PCT Pub. No.: WO2013/078947
PCT Pub. Date: Jun. 6, 2013

(65) Prior Publication Data
US 2014/0348048 A1    Nov. 27, 2014

(30) Foreign Application Priority Data

Nov. 30, 2011 (CN) .......................... 2011 1 0389521
Feb. 17, 2012 (CN) .......................... 2012 1 0037083

(51) Int. Cl.
*H04L 5/00* (2006.01)
*H04W 52/22* (2009.01)
(Continued)

(52) U.S. Cl.
CPC ........... *H04L 5/0055* (2013.01); *H04L 1/1861* (2013.01); *H04W 52/221* (2013.01); *H04W 52/54* (2013.01); *H04W 76/048* (2013.01); *H04W 76/064* (2013.01)

(58) Field of Classification Search
None
See application file for complete search history.

(56) References Cited

U.S. PATENT DOCUMENTS

2012/0155337 A1* 6/2012 Park ...................... H04L 1/1692
370/280
2013/0077541 A1 3/2013 Lin et al.
(Continued)

FOREIGN PATENT DOCUMENTS

CN    101127584 A    2/2008
CN    102083211 A    6/2011
(Continued)

OTHER PUBLICATIONS

PCT International Search Report Dated Feb. 28, 2013, Application No. PCT/CN2012/084640, 4 Pages.
(Continued)

*Primary Examiner* — Jeffrey M Rutkowski
*Assistant Examiner* — Mehedi Aley
(74) *Attorney, Agent, or Firm* — Brooks Kushman P.C.

(57) ABSTRACT

A method and apparatus for allocating resources to carrier response information feedback are disclosed. Wherein, when Transmit Power Control (TPC) command in Downlink Control Information (DCI) for each secondary component carrier in carrier aggregation is different, Physical Uplink Control Channel (PUCCH) resources allocated to the response information feedback of the secondary component carriers are high-layer configuration PUCCH resources designated by TPC command in the DCI which triggers data services in the secondary component carriers. The present solution can not only effectively feedback response information, but also can effectively suppress occurrence of unnecessary downlink retransmission.

16 Claims, 1 Drawing Sheet

(51) Int. Cl.
*H04L 1/18* (2006.01)
*H04W 52/54* (2009.01)
*H04W 76/04* (2009.01)
*H04W 76/06* (2009.01)

(56) References Cited

U.S. PATENT DOCUMENTS

2013/0242815 A1* 9/2013 Wang .................. H04L 1/1854
370/280
2014/0092824 A1* 4/2014 He .................. H04W 52/0212
370/329

FOREIGN PATENT DOCUMENTS

| CN | 102170339 A | 8/2011 | |
|---|---|---|---|
| CN | 102237982 A | 11/2011 | |
| KR | WO2012060628 A2 * | 5/2012 | ............. H04B 7/26 |

OTHER PUBLICATIONS

Extended European Search Report for EP 12853637.2, Completed by the European Patent Office, Dated Mar. 30, 2015, 4 Pages.
3GPP TSG RAN WG1 Meeting No. 65, Source LG Electronics, May 9-13, 2011, 8 Pages, "Remaining Issued on Resource Allocation for TDD PUCCH format 3."
3G00 TSG RAN WG1 Meeting No. 64, Source NTT DOCOMO Feb. 21-25, 2011, 6 Pages, "Remaining Issue Regarding Resource Allocation for Channel Selection."

* cited by examiner

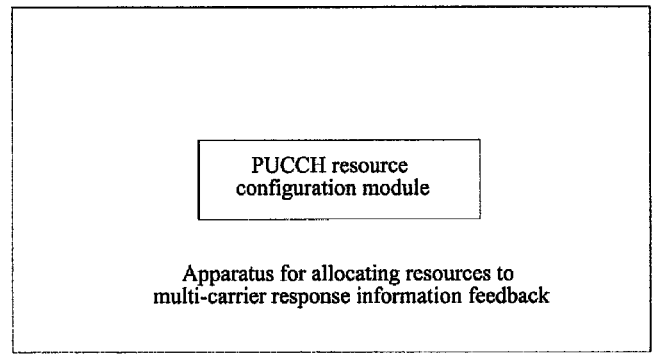

METHOD AND DEVICE FOR ALLOCATING RESOURCES TO CARRIER RESPONSE INFORMATION

CROSS-REFERENCE TO RELATED APPLICATIONS

This application is a U.S. national phase of PCT Application No. PCT/CN2012/084640 filed Nov. 15, 2012 which claims priority to Chinese Application No. 201110389521.7 filed Nov. 30, 2011, the disclosures of which are incorporated in their entirety by reference herein.

TECHNICAL FIELD

The patent document relates to the field of mobile communications, and in particular, to a method and apparatus for allocating resources to carrier response information feedback.

BACKGROUND OF THE RELATED ART

With the rapid development of the Long Term Evolution (LTE) system, the $3^{rd}$ Generation Partnership Project (3GPP) gradually develops research works on Long Term Evolution-Advanced (LTE-Advanced; LTE-A) related technologies. Compared with the LTE system, the LTE-Advanced system has a very large enhancement in terms of key technologies, and has successively introduced the Carrier Aggregation (CA), Relay, Coordinated Multiple Points (COMP), enhanced multi-antenna, uplink multi-antenna, etc.

In terms of system bandwidth, the LTE-A needs to support higher uplink and downlink transmission rates, the downlink needs to support a data transmission rate of 1 Gbps, and requirements are meet only when the bandwidth reaches to 100 MHz. In addition, the LTE-Advanced needs to be compatible with the LTE. Therefore, carrier aggregation is proposed in the LTE-Advanced. The carrier aggregation may be aggregation in continuous carriers, or may also be aggregation in non-continuous carriers.

Under the carrier aggregation, the number of component carriers designed by the LTE-A is 5 at most. Thus, for one UE, there may be a large number of bits of the response information fed back in the uplink control channel (including Acknowledgement (ACK), Negative Acknowledgement (NACK), and Discontinuous Transmission (DTX) of the base station). Then in a condition that the power of a User Equipment (UE) is limited, the UE may not transmit enough ACK/NACK information. The current LTE-Advanced system provides an ACK feedback mode of ACK/NACK for a single carrier and dual carriers, but as to an ACK/NACK feedback mode for more than two carriers, there is no solution in the related art.

SUMMARY OF THE INVENTION

The technical problem to be solved by the patent document is to provide a method and apparatus for allocating resources to carrier response information feedback, which solves a problem of effectively feeding back response information and suppressing unnecessary downlink retransmission in a condition that the number of carriers is greater than 2.

In order to solve the above technical problem, the patent document provides a method for allocating resources to multi-carrier response information feedback, wherein, when Transmit Power Control (TPC) command in Downlink Control Information (DCI) of various secondary component carriers in carrier aggregation is different, Physical Uplink Control Channel (PUCCH) resources allocated to the response information feedback of the secondary component carriers are higher layers configuration PUCCH resources designated by TPC command in the DCI which triggers data services in the secondary component carriers;

when the TPC command information in the DCI of various secondary component carriers is the same, a PUCCH resource corresponding to a first secondary component carrier, referred to as $n_{PUCCH,1}^{(1)}$ is a higher-layers configuration PUCCH resource designated by a TPC command in the DCI which triggers a data service in the first secondary component carrier;

when the number of secondary component carriers is 2, a PUCCH resource corresponding to a second secondary component carrier is $n_{PUCCH,2}^{(1)} = \lceil n_{PUCCH,1}^{(1)} + 1 * c \rceil$;

when the number of secondary component carriers is 3, a PUCCH resource corresponding to a third secondary component carrier is $n_{PUCCH,3}^{(1)} = \lceil n_{PUCCH,1}^{(1)} + 2 * c \rceil$; and when the number of secondary component carriers is 4, a PUCCH resource corresponding to a fourth secondary component carrier is $n_{PUCCH,4}^{(1)} = \lceil n_{PUCCH,1}^{(1)} + 3 * c \rceil$, wherein, c is a resource location adjustment factor, which is a positive integer, and $\lceil \; \rceil$ represents rounding up to an integer.

Preferably, the above method may further have the following features:

when a Physical Downlink Shared Channel (PDSCH) transmission with a corresponding Physical Downlink Control Channel (PDCCH) or a PDCCH indicating a downlink SPS release on a primary cell is transmitted in a subframe in the carrier aggregation, a PUCCH resource location $n_{PUCCH,0}^{(1)}$ allocated to response information feedback of the primary cell is a sum of $n_{CCE,0}$ and $N_{PUCCH}^{(1)}$, wherein, $n_{CCE,0}$ is the number of the first Control Channel Element (CCE) used for transmission of the PDCCH related to downlink services of the primary cell, and $N_{PUCCH}^{(1)}$ is a location offset value of a PUCCH resource configured by higher layers; and when the PDSCH transmission with the corresponding PDCCH or the PDCCH indicating the downlink SPS release on the primary cell is not transmitted in the subframe in the carrier aggregation, a PUCCH resource location allocated to response information feedback of the primary cell is higher-layers configuration PUCCH resource designated by a TPC command in the DCI when triggering downlink Semi-Persistent Scheduling (SPS).

Preferably, the above method may further have the following features:

when a value of the TPC command is 00, it corresponds to a first PUCCH resource configured by the high layer;

when the value of the TPC command is 01, it corresponds to a second PUCCH resource configured by the higher layers;

when the value of the TPC command is 10, it corresponds to a third PUCCH resource configured by the higher layers; and when the value of the TPC command is 11, it corresponds to a fourth PUCCH resource configured by the higher layers.

Preferably, the above method may further have the following features:

the response message includes an Acknowledgement (ACK), a Negative Acknowledgement (NACK) and a Discontinuous Transmission (DTX) of a base station.

In order to solve the above technical problem, the patent document further provides a multi-carrier response information feedback method in carrier aggregation, wherein, a base station allocates Physical Uplink Control Channel (PUCCH) resources to response information feedback of various secondary component carriers in carrier aggregation, and a UE feeds back response information in various secondary component carriers according to the PUCCH resources allocated to various secondary component carriers by the base station;

when Transmit Power Control (TPC) command information in Downlink Control Information (DCI) of various secondary component carriers in carrier aggregation is different, PUCCH resources allocated to the response information feedback of the secondary component carriers are higher-layer configuration PUCCH resources designated by TPC command in the DCI which triggers data services in the secondary component carriers;

when the TPC command in the DCI of various secondary component carriers is the same, a PUCCH resource corresponding to a first secondary component carrier, referred to as $n_{PUCCH,1}^{(1)}$ is a higher layer configuration PUCCH resource designated by a TPC command in the DCI which triggers a data service in the first secondary component carrier;

when the number of secondary component carriers is 2, a PUCCH resource corresponding to a second secondary component carrier is $n_{PUCCH,2}^{(1)} = \lceil n_{PUCCH,1}^{(1)} + 1*c \rceil$;

when the number of secondary component carriers is 3, a PUCCH resource corresponding to a third secondary component carrier is $n_{PUCCH,3}^{(1)} = \lceil n_{PUCCH,1}^{(1)} + 2*c \rceil$; and when the number of secondary component carriers is 4, a PUCCH resource corresponding to a fourth secondary component carrier is $n_{PUCCH,4}^{(1)} = \lceil n_{PUCCH,1}^{(1)} + 3*c \rceil$, wherein, c is a resource location adjustment factor, which is a positive integer greater than 0, and $\lceil \ \rceil$ represents rounding up to an integer.

Preferably, the above method may further have the following features:

the response message includes an Acknowledgement (ACK), a Negative Acknowledgement (NACK) and a Discontinuous Transmission (DTX) of a base station.

In order to solve the above technical problem, the patent document further provides an apparatus for allocating resources to multi-carrier response information feedback, wherein, the apparatus comprises a Physical Uplink Control Channel (PUCCH) resource configuration module;

the PUCCH resource configuration module is configured to allocate PUCCH resources to response information feedback of various secondary component carriers in carrier aggregation, wherein when Transmit Power Control (TPC) command in Downlink Control Information (DCI) of various secondary component carriers in carrier aggregation is different, the PUCCH resources allocated to the response information feedback of the secondary component carriers are higher-layer configuration PUCCH resources designated by TPC command in the DCI which triggers data services in the secondary component carriers;

the PUCCH resource configuration module is further configured to allocate a PUCCH resource, referred to as $n_{PUCCH,1}^{(1)}$, to a first secondary component carrier, wherein $n_{PUCCH,1}^{(1)}$ is a higher-layer configuration PUCCH resource designated by a TPC command in the DCI which triggers a data service in the first secondary component carrier, when the TPC command in the DCI of various secondary component carriers is the same;

when the number of secondary component carriers is 2, a PUCCH resource allocated to a second secondary component carrier is $n_{PUCCH,2}^{(1)} = \lceil n_{PUCCH,1}^{(1)} + 1*c \rceil$;

when the number of secondary component carriers is 3, a PUCCH resource allocated to a third secondary component carrier is $n_{PUCCH,3}^{(1)} = \lceil n_{PUCCH,1}^{(1)} + 2*c \rceil$; and when the number of secondary component carriers is 4, a PUCCH resource allocated to a fourth secondary component carrier is $n_{PUCCH,4}^{(1)} = \lceil n_{PUCCH,1}^{(1)} + 3*c \rceil$, wherein, c is a resource location adjustment factor, which is a positive integer greater than 0, and $\lceil \ \rceil$ represents rounding up to an integer.

Preferably, the above apparatus may further have the following features:

the PUCCH resource configuration module is further configured to configure a PUCCH resource location $n_{PUCCH,0}^{(1)}$ allocated to response information feedback of a primary cell to be a sum of $n_{CCE,0}$ and $N_{PUCCH}^{(1)}$ when a Physical Downlink Shared Channel (PDSCH) with a corresponding Physical Downlink Control Channel (PDCCH) or a PDCCH indicating a downlink SPS services release on the primary cell is transmitted in a subframe in the carrier aggregation, wherein, $n_{CCE,0}$ is the number of the first Control Channel Element (CCE) used for transmission of the PDCCH related to downlink services of the primary cell, and $N_{PUCCH}^{(1)}$ is a location offset value of a PUCCH resource configured by the higher layer; and the PUCCH resource configuration module is further configured to configure a PUCCH resource location allocated to response information feedback of the primary cell to be a higher-layer configuration PUCCH resource designated by a TPC command in the DCI when downlink Semi Persistent Scheduling (SPS) is triggered, when the PDSCH with the corresponding PDCCH or the PDCCH indicating the downlink SPS release on the primary cell is not transmitted in the subframe in the carrier aggregation.

Preferably, the above apparatus may further have the following features:

when the value of the TPC command is 00, it corresponds to a first PUCCH resource configured by higher layers;

when the value of the TPC command is 01, it corresponds to a second PUCCH resource configured by the high layer;

when the value of the TPC command is 10, it corresponds to a third PUCCH resource configured by the higher layers; and when the value of the TPC command is 11, it corresponds to a fourth PUCCH resource configured by the higher layers.

Preferably, the above apparatus may further have the following features:

the response message includes an Acknowledgement (ACK), a Negative Acknowledgement (HACK) and a Discontinuous Transmission (DTX) of the base station.

The embodiments of the present invention provide a response message feedback method and system when the number of carriers is greater than 2, which can not only effectively feedback response information, but also can effectively suppress occurrence of unnecessary downlink data retransmission.

BRIEF DESCRIPTION OF DRAWINGS

FIG. 1 is a diagram of an apparatus for allocating resources to multi-carrier response information feedback.

PREFERRED EMBODIMENTS OF THE PRESENT INVENTION

PUCCH resources allocated to response message feedback of various carriers when the number of carriers in carrier aggregation is 3, 4 or 5 are shown in table 1, wherein, PCC represents a primary component carrier, SCC represents a secondary component carrier, SCC1 represents a first secondary component carrier, SCC2 represents a second secondary component carrier, SCC3 represents a third secondary component carrier, and SCC4 represents a fourth secondary component carrier.

TABLE 1

| Number of carriers | PCC i = 0 | SCC1 i = 1 | SCC2 i = 2 | SCC3 i = 3 | SCC4 i = 4 |
|---|---|---|---|---|---|
| 3 | Resource 1 | Resource 2 | Resource 3 | NA | NA |
| 4 | Resource 1 | Resource 2 | Resource 3 | Resource 4 | NA |
| 5 | Resource 1 | Resource 2 | Resource 3 | Resource 4 | Resource 4 |

A method for allocating resources to multi-carrier response information feedback comprises the following contents.

When Transmit Power Control (TPC) command in Downlink Control Information (DCI) of various secondary component carriers in carrier aggregation is different, Physical Uplink Control Channel (PUCCH) resources allocated to the response information feedback of the secondary component carriers are higher layers configuration PUCCH resources designated by TPC command in the DCI information which triggers data services in the secondary component carriers.

The TPC command is different from a TPC command in the DCI which triggers a downlink SPS in the PCC.

For example, as shown in table 2, $n_{PUCCH}^{(1)}$ represents a PUCCH resource allocated to a $i^{th}$ SCC.

TABLE 2

TPC value in a DCI field which triggers a downlink data service in the $i^{th}$ SCC

| The value of TPC command | $n_{PUCCH,i}^{(1)}$ |
|---|---|
| '00' | The first PUCCH resource configured by the higher layers |
| '01' | The second PUCCH resource configured by the higher layers |
| '10' | The third PUCCH resource configured by the higher layers |
| '11' | The fourth PUCCH resource configured by the higher layers |

Wherein, the value of the TPC command and the location of the PUCCH resources configured by the higher layers are not limited to the correspondence in the above table, and may also be in another correspondence.

When the TPC command in the DCI of various secondary component carriers is the same, a PUCCH resource corresponding to a first secondary component carrier, referred to as $n_{PUCCH}^{(1)}$, is a higher layer configuration PUCCH resource designated by a TPC command in the DCI which triggers a data service in the secondary component carrier, as indicated in the allocation mode in table 2.

When the number of secondary component carriers is 2, a PUCCH resource corresponding to a second secondary component carrier SCC2 is $n_{PUCCH,2}^{(1)} = \lceil n_{PUCCH,1}^{(1)} 1*c \rceil$;

when the number of secondary component carriers is 3, a PUCCH resource corresponding to a third secondary component carrier SCC3 is $n_{PUCCH,3}^{(1)} = \lceil n_{PUCCH,1}^{(1)} 2*c \rceil$; and when the number of secondary component carriers is 4, a PUCCH resource corresponding to a fourth secondary component carrier SCC4 is $n_{PUCCH,4}^{(1)} = \lceil n_{PUCCH,1}^{(1)} 3*c \rceil$;

wherein, c is a resource location adjustment factor, which is a positive integer greater than 0, and $\lceil \; \rceil$ represents rounding up to an integer.

In the above method, PUCCH resources corresponding to various carriers are different.

A method for allocating PUCCH resources to response message feedback of a primary component carrier in carrier aggregation comprises the following contents. Firstly, when a Physical Downlink Shared Channel (PDSCH) with a corresponding Physical Downlink Control Channel (PDCCH) or a PDCCH indicating a downlink SPS release on the primary cell is transmitted in a subframe in the carrier aggregation, a PUCCH resource location $n_{PUCCH,0}^{(1)}$ allocated to response information feedback of the primary cell is a sum of $n_{CCE,0}$ and $n_{PUCCH}^{(1)}$, wherein, $n_{CCE,0}$ is the number of the first Control Channel Element (CCE) used for transmission of the PDCCH related to downlink services of the primary cell, and $N_{PUCCH}^{(1)}$ is a location offset value of a PUCCH resource configured by the higher layer.

Secondly, when the PDSCH with the corresponding PDCCH or the PDCCH indicating the downlink SPS release on the primary cell is not transmitted in the subframe in the carrier aggregation, a PUCCH resource location allocated to response information feedback of the primary cell is a higher layer configuration PUCCH resource designated by a TPC command in the DCI when the downlink Semi-Persistent Scheduling (SPS) is triggered.

For example, as shown in table 3, a value of TPC is one of four values in table 2, wherein, $n_{PUCCH,0}^{(1)}$ represents a PUCCH resource allocated to a primary component carrier.

TABLE 3

TPC value in a DCI field which triggers a downlink SPS

| The value of TPC command | $n_{PUCCH,0}^{(1)}$ |
|---|---|
| '00' | The first PUCCH resource configured by the higher layers |
| '01' | The second PUCCH resource configured by the higher layers |
| '10' | The third PUCCH resource configured by the higher layers |
| '11' | The fourth PUCCH resource configured by the higher layers |

Wherein, the value of the TPC command and the location of the PUCCH resources configured by the higher layer are not limited to the correspondence in the above table, and may also be in another correspondence.

The response message includes an Acknowledgement (ACK), a Negative Acknowledgement (NACK) and a Discontinuous Transmission (DTX) of a base station.

An apparatus for allocating resources to multi-carrier response information feedback corresponding to the above method is located at a base station side. As shown in FIG. 1, the apparatus comprises a Physical Uplink Control Channel (PUCCH) resource configuration module; and the mode of the module allocating PUCCH resources to the response message feedback of various carriers in carrier aggregation is the same as what is described in the above method, and the description thereof will be omitted.

On basis of the above method, after the base station uses the above method to allocate PUCCH resources to response information feedback of various secondary component carriers, the UE feeds back response information in various secondary component carriers according to the PUCCH resources allocated to various secondary component carriers by the base station. Specifically, after the UE obtains the PUCCH resources, the UE corresponds the ACK/NACK information in the current carrier of the UE to a PUCCH resource, and then corresponds the PUCCH resource to the 2-bit information of b(0)b(1), thus implementing transmitting corresponding ACK/NACK information to the base station by the UE using a PUCCH1b format.

With the ACK/NACK feedback method described above, it can effectively solve a problem of a UE feeding back an ACK/NACK to a base station in a condition that the number of carriers is greater than 2, which can effectively suppress unnecessary data retransmission initiated by the base station due to failure of ACK/NACK feedback, thus effectively enhancing the throughput of the LTE-Advanced system.

The present solution will be described below using specific embodiments.

Specific embodiment one:

The number of carriers configured by the UE is 3. There is one primary component carrier, a PDSCH transmission on the primary cell is with a corresponding PDCCH, there are two secondary component carriers, and c=1. Then, PUCCH resources corresponding to the secondary component carriers are as follows.

SCC1: $n_{PUCCH,1}^{(1)} = n_{PUCCH,i}^{(1)}$, which is given by higher layers, and it is sent to the UE through a TPC command in the DCI, and the value of the TPC is shown in table 2.

SCC2: $n_{PUCCH,2}^{(1)} = n_{PUCCH,1}^{(1)} + 1$.

A PDSCH transmission on the primary cell is with a corresponding PDCCH, and a resource corresponding to the primary component carrier is:

$$n_{PUCCH,0}^{(1)} = n_{CCE,0} + N_{PUCCH}^{(1)}$$

$n_{CCE,0}$ is the number of the first CCE used for transmission of the PDCCH related to downlink services of the PCC.

A mapping relationship between 2 bits of the PUCCH1b constructed at the UE side and the PUCCH resources and ACK/NACK corresponding to downlink data of various carriers is as follows.

TABLE 4

Mapping table between ACK/NACK information and PUCCH1b resources when the number of carriers is 3

| PCC | SCC1 | SCC2 | $n_{PUCCH,i}^{(1)}$ | b(0)b(1) |
|---|---|---|---|---|
| ACK | ACK | ACK | $n_{PUCCH,1}^{(1)}$ | 1,1 |
| ACK | ACK | NACK/DTX | $n_{PUCCH,1}^{(1)}$ | 1,0 |
| ACK | NACK/DTX | ACK | $n_{PUCCH,1}^{(1)}$ | 0,1 |
| NACK/DTX | ACK | ACK | $n_{PUCCH,2}^{(1)}$ | 1,1 |
| ACK | NACK/DTX | NAXK/DTX | $n_{PUCCH,0}^{(1)}$ | 1,1 |
| NACK/DTX | ACK | NACK/DTX | $n_{PUCCH,0}^{(1)}$ | 1,0 |
| NACK/DTX | NACK/DTX | ACK | $n_{PUCCH,0}^{(1)}$ | 0,1 |
| NACK | NACK | NACK | $n_{PUCCH,2}^{(1)}$ | 0,0 |
| NACK | DTX | DTX | $n_{PUCCH,0}^{(1)}$ | 0,0 |
| DTX | NACK | DTX | $n_{PUCCH,0}^{(1)}$ | 0,0 |
| DTX | DTX | NACK | $n_{PUCCH,2}^{(1)}$ | 0,0 |
| DTX | DTX | DTX | no transmission of PUCCH | |

This table is an example of the present embodiment, and a correspondence between the PUCCH resources and the ACK/NACK feedback is not limited thereto.

Specific embodiment two:

The number of carriers configured by the UE is 4. There is one primary component carrier, a PDSCH transmission on the primary cell is without a corresponding PDCCH, there are three secondary component carriers, and c=1. Then, PUCCH resources corresponding to the secondary component carriers are as follows.

SCC1: $n_{PUCCH,1}^{(1)} = n_{PUCCH,i}^{(1)}$, which is given by higher layers, and it is sent to the UE through a TPC command in the DCI, and the value of the TPC is shown in table 2.

SCC2: $n_{PUCCH,2}^{(1)} = n_{PUCCH,1}^{(1)} + 1$.
SCC3: $n_{PUCCH,3}^{(1)} = n_{PUCCH,1}^{(1)} + 2$.

a PDSCH transmission on the primary cell is without a corresponding PDCCH, thus the resource corresponding to the primary component carrier is consistent with the PUCCH resource information represented by the TPC command in the related DCI information in the PCC. Assume that TPC=00, then $n_{PUCCH,0}^{(1)}$ is the first PUCCH resource configured by higher layers which is represented by "00", and the specific values are shown in table 3.

A mapping relationship between 2 bits of the PUCCH1b constructed at the UE side and the PUCCH resources and ACK/NACK corresponding to downlink data of various carriers are as follows.

TABLE 5

Mapping table between ACK/NACK information and PUCCH1b resources when the number of carriers is 4

| PCC | SCC1 | SCC2 | SCC3 | $n_{PUCCH,i}^{(1)}$ | b(0)b(1) |
|---|---|---|---|---|---|
| ACK | ACK | ACK | ACK | $n_{PUCCH,1}^{(1)}$ | 1,1 |
| ACK | ACK | ACK | NACK/DTX | $n_{PUCCH,2}^{(1)}$ | 0,1 |
| ACK | ACK | NACK/DTX | ACK | $n_{PUCCH,1}^{(1)}$ | 0,1 |
| ACK | NACK/DTX | ACK | ACK | $n_{PUCCH,3}^{(1)}$ | 1,1 |
| NACK/DTX | ACK | ACK | ACK | $n_{PUCCH,1}^{(1)}$ | 1,0 |
| NACK/DTX | NACK/DTX | ACK | ACK | $n_{PUCCH,2}^{(1)}$ | 0,0 |
| ACK | NACK/DTX | NACK/DTX | ACK | $n_{PUCCH,1}^{(1)}$ | 0,0 |
| ACK | ACK | NACK/DTX | NACK/DTX | $n_{PUCCH,3}^{(1)}$ | 1,0 |
| NACK/DTX | ACK | ACK | NACK/DTX | $n_{PUCCH,2}^{(1)}$ | 1,1 |
| NACK/DTX | NACK/DTX | NACK/DTX | ACK | $n_{PUCCH,2}^{(1)}$ | 1,0 |
| ACK | NACK/DTX | NACK/DTX | NACK/DTX | $n_{PUCCH,3}^{(1)}$ | 0,1 |
| NACK/DTX | ACK | NACK/DTX | NACK/DTX | $n_{PUCCH,3}^{(1)}$ | 0,0 |
| NACK/DTX | NACK/DTX | ACK | NACK/DTX | $n_{PUCCH,0}^{(1)}$ | 1,1 |
| NACK | NACK/DTX | NACK/DTX | NACK/DTX | $n_{PUCCH,0}^{(1)}$ | 1,0 |
| NACK/DTX | NACK | NACK/DTX | NACK/DTX | $n_{PUCCH,0}^{(1)}$ | 0,1 |
| NACK/DTX | NACK/DTX | NACK | NACK/DTX | $n_{PUCCH,0}^{(1)}$ | 0,0 |
| NACK/DTX | NACK/DTX | NACK/DTX | NACK | $n_{PUCCH,0}^{(1)}$ | 0,0 |
| DTX | DTX | DTX | DTX | no transmission of PUCCH | |

This table is an example of the present embodiment, and a correspondence between the PUCCH resources and the ACK/NACK feedback is not limited thereto.

Specific embodiment three:

The number of carriers configured by the UE is 5. There is one primary component carrier, a PDSCH transmission on the primary cell is with a corresponding PDCCH, there are four secondary component carriers, and c=1. Then, PUCCH resources corresponding to the secondary component carriers are as follows.

SCC1: $n_{PUCCH,1}^{(1)} = n_{PUCCH,i}^{(1)}$, which is given by higher layers, and it is sent to the UE through a TPC command in the DCI, and the value of the TPC is shown in table 2.

SCC2: $n_{PUCCH,2}^{(1)} = n_{PUCCH,1}^{(1)} + 1$.
SCC3: $n_{PUCCH,3}^{(1)} = n_{PUCCH,1}^{(1)} + 2$.
SCC4: $n_{PUCCH,4}^{(1)} = n_{PUCCH,1}^{(1)} + 3$.

a PDSCH transmission on the primary cell is with a corresponding PDCCH, and a resource corresponding to the primary component carrier is:

$$n_{PUCCH,0}^{(1)} = n_{CCE,0} + p_{PUCCH}^{(1)}$$

$n_{CCE,0}$ is the number of the first CCE used for transmission of the PDCCH related to downlink services of the PCC.

A mapping relationship between 2 bits of the PUCCH 1b constructed at the UE side and the PUCCH resources and ACK/NACK corresponding to downlink data of various carriers is as follows.

TABLE 6

Mapping table between ACK/NACK information and PUCCH1b resources when the number of carriers is 5

| PCC | SCC1 | SCC2 | SCC3 | SCC4 | $n_{PUCCH,i}^{(1)}$ | b(0)b(1) |
|---|---|---|---|---|---|---|
| ACK | ACK | ACK | ACK | ACK | $n_{PUCCH,1}^{(1)}$ | 1, 1 |
| ACK | ACK | ACK | ACK | NACK/DTX | $n_{PUCCH,2}^{(1)}$ | 0, 1 |
| ACK | ACK | ACK | NACK/DTX | ACK | $n_{PUCCH,1}^{(1)}$ | 0, 1 |
| ACK | ACK | NACK/DTX | ACK | ACK | $n_{PUCCH,3}^{(1)}$ | 1, 1 |
| ACK | NACK/DTX | ACK | ACK | ACK | $n_{PUCCH,1}^{(1)}$ | 1, 0 |
| NACK/DTX | ACK | ACK | ACK | ACK | $n_{PUCCH,2}^{(1)}$ | 0, 0 |
| ACK | ACK | ACK | NACK/DTX | NACK/DTX | $n_{PUCCH,1}^{(1)}$ | 0, 0 |
| ACK | ACK | NACK/DTX | NACK/DTX | ACK | $n_{PUCCH,3}^{(1)}$ | 1, 0 |
| ACK | NACK/DTX | NACK/DTX | ACK | ACK | $n_{PUCCH,2}^{(1)}$ | 1, 1 |
| NACK/DTX | NACK/DTX | ACK | ACK | ACK | $n_{PUCCH,2}^{(1)}$ | 1, 0 |
| NACK/DTX | ACK | ACK | ACK | NACK/DTX | $n_{PUCCH,3}^{(1)}$ | 0, 1 |
| ACK | NACK/DTX | NACK/DTX | NACK/DTX | ACK | $n_{PUCCH,3}^{(1)}$ | 0, 0 |
| ACK | ACK | NACK/DTX | NACK/DTX | NACK/DTX | $n_{PUCCH,0}^{(1)}$ | 1, 1 |
| NACK/DTX | NACK/DTX | NACK/DTX | ACK | ACK | $n_{PUCCH,0}^{(1)}$ | 1, 0 |
| NACK/DTX | NACK/DTX | ACK | ACK | NACK/DTX | $n_{PUCCH,0}^{(1)}$ | 0, 1 |
| NACK/DTX | ACK | ACK | NACK/DTX | NACK/DTX | $n_{PUCCH,0}^{(1)}$ | 0, 0 |
| NACK/DTX | NACK/DTX | NACK/DTX | NACK/DTX | ACK | $n_{PUCCH,4}^{(1)}$ | 0, 0 |
| NACK/DTX | NACK/DTX | NACK/DTX | ACK | NACK/DTX | $n_{PUCCH,4}^{(1)}$ | 1, 1 |
| NACK/DTX | NACK/DTX | ACK | NACK/DTX | NACK/DTX | $n_{PUCCH,4}^{(1)}$ | 1, 0 |
| NACK/DTX | ACK | NACK/DTX | NACK/DTX | NACK/DTX | $n_{PUCCH,4}^{(1)}$ | 0, 1 |
| ACK | NACK/DTX | NACK/DTX | NACK/DTX | NACK/DTX | $n_{PUCCH,2}^{(1)}$ | 1, 1 |
| NACK/DTX | NACK/DTX | NACK/DTX | NACK/DTX | NACK/DTX | $n_{PUCCH,2}^{(1)}$ | 1, 0 |

TABLE 6-continued

Mapping table between ACK/NACK information and PUCCH1b resources when the number of carriers is 5

This table is an example of the present embodiment, and a correspondence between the PUCCH resources and the ACK/NACK feedback is not limited thereto.

It should be illustrated that, in the case of no conflict, the embodiments of this application and the features in the embodiments could be combined randomly with each other.

Of course, the patent document can have a plurality of other embodiments. Without departing from the spirit and substance of the patent document, those skilled in the art can make various corresponding changes and variations according to the patent document, and all these corresponding changes and variations should belong to the protection scope of the appended claims in the patent document.

A person having ordinary skill in the art can understand that all or a part of steps in the above method can be implemented by programs instructing related hardware, and the programs can be stored in a computer readable storage medium, such as a read-only memory, a disk or a disc etc. Alternatively, all or a part of steps in the above examples can also be implemented by one or more integrated circuits. Accordingly, each module/unit in the above embodiments can be implemented in the form of hardware, or can also be implemented in the form of software functional module. The patent document is not limited to any particular form of a combination of hardware and software.

INDUSTRIAL APPLICABILITY

The embodiments of the present invention provide a response message feedback method and system when the number of carriers is greater than 2, which can not only effectively feedback response information, but also can effectively suppress occurrence of unnecessary downlink data retransmission.

What is claimed is:

1. A method for allocating resources to multi-carrier response information feedback, wherein, the number of carriers is greater than 2, when Transmit Power Control (TPC) command in Downlink Control Information (DCI) of various secondary component carriers in carrier aggregation is different, Physical Uplink Control Channel (PUCCH) resources allocated to response information feedback of the secondary component carriers are higher layer configuration PUCCH resources designated by TPC command in the DCI which triggers data services in the secondary component carriers;

when the TPC command in the DCI of various secondary component carriers is the same, a PUCCH resource corresponding to a first secondary component carrier, referred to as $n_{PUCCH,1}^{(1)}$, is a higher layer configuration PUCCH resource designated by a TPC command in the DCI which triggers a data service in the first secondary component carrier;

when the number of secondary component carriers is 2, a PUCCH resource corresponding to a second secondary component carrier is $n_{PUCCH,2}^{(1)} = \lceil n_{PUCCH,1}^{(1)} + 1*c \rceil$;

when the number of secondary component carriers is 3, a PUCCH resource corresponding to a third secondary component carrier is $n_{PUCCH,3}^{(1)}=\lceil n_{PUCCH,1}^{(1)}2*c \rceil$; and when the number of secondary component carriers is 4, a PUCCH resource corresponding to a fourth secondary component carrier is $n_{PUCCH,4}^{(1)}=\lceil n_{PUCCH,1}^{(1)}+3c \rceil$, wherein, c is a resource location adjustment factor, which is a positive integer, and $\lceil \ \rceil$ represents rounding up to an integer.

2. The method according to claim 1, wherein, when a Physical Downlink Shared Channel (PDSCH) transmission with a corresponding Physical Downlink Control Channel (PDCCH) or a PDCCH indicating a downlink SPS release on a primary cell is transmitted in a subframe in the carrier aggregation, a PUCCH resource location $n_{PUCCH,0}^{(1)}$ allocated to response information feedback of the primary cell is a sum of $n_{CCE,0}$ and $n_{PUCCH}^{(1)}$, wherein, $n_{CCE,0}$ is the number of the first Control Channel Element (CCE) used for transmission of the PDCCH related to downlink services of the primary cell, and $n_{PUCCH}^{(1)}$ is a location offset value of a PUCCH resource configured by higher layers; and when the PDSCH transmission with the corresponding PDCCH or the PDCCH indicating the downlink SPS release on the primary cell is not transmitted in the subframe in the carrier aggregation, the PUCCH resource location allocated to the response information feedback of the primary cell is a higher layer configuration PUCCH resource designated by a TPC command in the DCI when downlink Semi Persistent Scheduling (SPS) is triggered.

3. The method according to claim 2, wherein, when a value of the TPC command is 00, the TPC command corresponds to a first PUCCH resource configured by higher layers;

when the value of the TPC command is 01, the TPC command corresponds to a second PUCCH resource configured by the higher layers;

when the value of the TPC command is 10, the TPC command corresponds to a third PUCCH resource configured by the higher layers; and when the value of the TPC command is 11, the TPC command corresponds to a fourth PUCCH resource configured by the higher layers.

4. The method according to claim 2, wherein, the response information comprises an Acknowledgement (ACK), a Negative Acknowledgement (NACK) and a Discontinuous Transmission (DTX) of a base station.

5. The method according to claim 1, wherein, when a value of the TPC command is 00, the TPC command corresponds to a first PUCCH resource configured by higher layers;

when the value of the TPC command is 01, the TPC command corresponds to a second PUCCH resource configured by the higher layers;

when the value of the TPC command is 10, the TPC command corresponds to a third PUCCH resource configured by the higher layers; and when the value of the TPC command is 11, the TPC command corresponds to a fourth PUCCH resource configured by the higher layers.

6. The method according to claim 5, wherein, the response information comprises an Acknowledgement (ACK), a Negative Acknowledgement (NACK) and a Discontinuous Transmission (DTX) of a base station.

7. The method according to claim 1, wherein, the response information comprises an Acknowledgement (ACK), a Negative Acknowledgement (NACK) and a Discontinuous Transmission (DTX) of a base station.

8. A multi-carrier response information feedback method in carrier aggregation, wherein the number of carriers is greater than 2, and wherein, a base station allocates Physical Uplink Control Channel (PUCCH) resources to response information feedback of various secondary component carriers in carrier aggregation, and a UE feeds back response information in various secondary component carriers according to the PUCCH resources allocated to various secondary component carriers by the base station;

when the Transmit Power Control (TPC) command in Downlink Control Information (DCI) of various secondary component carriers in carrier aggregation is different, PUCCH resources allocated to response information feedback of the secondary component carriers are higher layer configuration PUCCH resources designated by TPC command in the DCI information which triggers data services in the secondary component carriers;

when the TPC command in the DCI of various secondary component carriers is the same, a PUCCH resource corresponding to a first secondary component carrier, referred to as $n_{PUCCH,1}^{(1)}$, is a higher layer configuration PUCCH resource designated by a TPC command in the DCI which triggers a data service in the first secondary component carrier;

when the number of secondary component carriers is 2, a PUCCH resource corresponding to a second secondary component carrier is $n_{PUCCH,2}^{(1)}=\lceil n_{PUCCH,1}^{(1)}+1*c \rceil$;

when the number of secondary component carriers is 3, a PUCCH resource corresponding to a third secondary component carrier is $n_{PUCCH,3}^{(1)}=\lceil n_{PUCCH,1}^{(1)}2*c \rceil$; and when the number of secondary component carriers is 4, a PUCCH resource corresponding to a fourth secondary component carrier is $n_{PUCCH,4}^{(1)}=\lceil n_{PUCCH,1}^{(1)}+3*c \lceil$, wherein, c is a resource location adjustment factor, which is a positive integer, and $\lceil \ \rceil$ represents rounding up to an integer.

9. The method according to claim 8, wherein, the response information includes an Acknowledgement (ACK), a Negative Acknowledgement (NACK) and a Discontinuous Transmission (DTX) of a base station.

10. An apparatus for allocating resources to multi-carrier response information feedback, wherein the number of carriers is greater than 2, and the apparatus comprises a Physical Uplink Control Channel (PUCCH) resource configuration module, a memory and a processor for implementing the PUCCH resource configuration module;

the PUCCH resource configuration module is configured to allocate PUCCH resources to response information feedback of various secondary component carriers in carrier aggregation, wherein when a Transmit Power Control (TPC) command in a Downlink Control Information (DCI) of various secondary component carriers in carrier aggregation is different, the PUCCH resources allocated to the response information feedback of the secondary component carriers are higher layer configuration PUCCH resources designated by TPC command in the DCI information which triggers data services in the secondary component carriers;

the PUCCH resource configuration module is further configured to allocate a PUCCH resource, referred to as nPUCCH,$_1$(1), to a first secondary component carrier, wherein the nPUCCH,$_1$(1) is a higher layer configuration PUCCH resource designated by a TPC command in the DCI information which triggers a data service in the first secondary component carrier, when the TPC command in the DCI information of various secondary component carriers is the same;

when the number of secondary component carriers is 2, a PUCCH resource allocated to a second secondary component carrier is nPUCCH,$_2$(1)=⌈nPUCCH,$_1$(1)+1*c⌉;

when the number of secondary component carriers is 3, a PUCCH resource allocated to a third secondary component carrier is nPUCCH,$_3$(1)=⌈nPUCCH,$_1$(1)+2*c⌉; and when the number of secondary component carriers is 4, a PUCCH resource allocated to a fourth secondary component carrier is nPUCCH,$_4$(1)=⌈nPUCCH,$_1$(1)+3*c⌉, wherein, c is a resource location adjustment factor, which is a positive integer greater than 0, and ⌈ ⌉ represents rounding up to an integer.

11. The apparatus according to claim 10, wherein, the PUCCH resource configuration module is further configured to configure a PUCCH resource location $n_{PUCCH,0}^{(1)}$ allocated to response information feedback of a primary cell to be a sum of $n_{CCE,0}$ and $N_{PUCCH}^{(1)}$ when a Physical Downlink Shared Channel (PDSCH) transmission with a corresponding Physical Downlink Control Channel (PDCCH) or a PDCCH indicating a downlink SPS services release on the primary cell is transmitted in a subframe in the carrier aggregation, wherein, $n_{CCE,0}$ is the number of the first Control Channel Element (CCE) used for transmission of the PDCCH related to downlink services of the primary cell, and $n_{PUCCH}^{(1)}$ is a location offset value of a PUCCH resource configured by higher layers; and the PUCCH resource configuration module is further configured to configure the PUCCH resource location allocated to the response information feedback of the primary cell to be a higher layer configuration PUCCH resource designated by a TPC command in the DCI when downlink Semi Persistent Scheduling (SPS) is triggered, when the PDSCH transmission with the corresponding PDCCH or the PDCCH indicating the downlink SPS release on the primary cell is not transmitted in the subframe in the carrier aggregation.

12. The apparatus according to claim 11, wherein, when a value of the TPC command is 00, the TPC command corresponds to a first PUCCH resource configured by higher layers;

when the value of the TPC command is 01, the TPC command corresponds to a second PUCCH resource configured by the higher layers;

when the value of the TPC command is 10, the TPC command corresponds to a third PUCCH resource configured by the higher layers; and when the value of the TPC command is 11, the TPC command corresponds to a fourth PUCCH resource configured by the higher layers.

13. The apparatus according to claim 11, wherein, the response information includes an Acknowledgement (ACK), a Negative Acknowledgement (NACK) and a Discontinuous Transmission (DTX) of a base station.

14. The apparatus according to claim 10, wherein, when a value of the TPC command is 00, the TPC command corresponds to a first PUCCH resource configured by higher layers;

when the value of the TPC command is 01, the TPC command corresponds to a second PUCCH resource configured by the higher layers;

when the value of the TPC command is 10, the TPC command corresponds to a third PUCCH resource configured by the higher layers; and when the value of the TPC command is 11, the TPC command corresponds to a fourth PUCCH resource configured by the higher layers.

15. The apparatus according to claim 14, wherein, the response information includes an Acknowledgement (ACK), a Negative Acknowledgement (NACK) and a Discontinuous Transmission (DTX) of a base station.

16. The apparatus according to claim 10, wherein, the response information includes an Acknowledgement (ACK), a Negative Acknowledgement (NACK) and a Discontinuous Transmission (DTX) of a base station.

* * * * *